United States Patent
Yasay et al.

(10) Patent No.: US 11,683,371 B2
(45) Date of Patent: Jun. 20, 2023

(54) AUTOMOTIVE NETWORK WITH CENTRALIZED STORAGE

(71) Applicant: Marvell Asia Pte, Ltd., Singapore (SG)

(72) Inventors: Donna Yasay, Irvine, CA (US); Johnny Lam, San Jose, CA (US); Hubert Bailey, Georgetown, TX (US); Noam Mizrahi, Modi'in (IL)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/094,844

(22) Filed: Nov. 11, 2020

(65) Prior Publication Data

US 2021/0144207 A1 May 13, 2021

Related U.S. Application Data

(60) Provisional application No. 62/934,436, filed on Nov. 12, 2019.

(51) Int. Cl.
| | | |
|---|---|---|
| *H04L 12/24* | (2006.01) | |
| *H04L 41/0803* | (2022.01) | |
| *H04L 67/1097* | (2022.01) | |
| *H04L 67/12* | (2022.01) | |

(52) U.S. Cl.
CPC .......... *H04L 67/1097* (2013.01); *H04L 67/12* (2013.01)

(58) Field of Classification Search
CPC ............................ H04L 67/1097; H04L 67/12
USPC ......................................................... 703/213
See application file for complete search history.

(56) References Cited

U.S. PATENT DOCUMENTS

| | | | | |
|---|---|---|---|---|
| 9,686,126 B2* | 6/2017 | Diab | .................. | H04L 41/0668 |
| 9,800,546 B2* | 10/2017 | Kim | ....................... | H04L 67/12 |
| 10,075,524 B1* | 9/2018 | Bshara | .................... | H04L 69/08 |
| 11,227,187 B1* | 1/2022 | Weinberger | .......... | G06T 7/0004 |
| 11,232,655 B2* | 1/2022 | Bhattacharyya | ........... | |
| | | | | H04L 12/40032 |
| 2005/0021874 A1* | 1/2005 | Georgiou | ............. | G06F 15/167 |
| | | | | 709/250 |
| 2012/0082171 A1* | 4/2012 | Georgiou | ............. | G06F 15/167 |
| | | | | 370/466 |
| 2012/0173900 A1* | 7/2012 | Diab | ...................... | H04L 12/10 |
| | | | | 713/310 |

(Continued)

OTHER PUBLICATIONS

International Application # PCT/IB2020/060608 Search Report dated Jan. 29, 2021.

(Continued)

*Primary Examiner* — Moustafa M Meky
*Assistant Examiner* — Elizabeth Kassa

(57) ABSTRACT

An automotive data storage system disposed in a vehicle includes a packet network and at least one centralized storage device. The packet network includes multiple electronic subsystems that are configured to generate data during operation of the vehicle, the electronic subsystems being deployed at different locations in the vehicle and being indirectly coupled to one another via network links and one or more network switches. The centralized storage device is installed in the vehicle and coupled to the packet network, and is configured to receive from the electronic subsystems write commands for storing the data, over the packet network, in accordance with a network storage protocol, and to store the data in the centralized storage device.

14 Claims, 2 Drawing Sheets

(56) References Cited

U.S. PATENT DOCUMENTS

| | | | | |
|---|---|---|---|---|
| 2012/0248569 | A1* | 10/2012 | Jenkins | H01L 23/49822 257/E27.026 |
| 2014/0078889 | A1* | 3/2014 | Diab | G06F 11/1423 370/221 |
| 2014/0215491 | A1* | 7/2014 | Addepalli | G06F 3/167 719/313 |
| 2018/0336144 | A1* | 11/2018 | Olarig | H04N 5/772 |
| 2019/0004737 | A1* | 1/2019 | Khan | G06F 3/0679 |
| 2019/0146682 | A1* | 5/2019 | Subramanian | G06F 3/0661 711/103 |
| 2019/0286607 | A1* | 9/2019 | Troia | G06F 13/4265 |
| 2019/0312892 | A1* | 10/2019 | Chung | G06F 21/554 |
| 2020/0015075 | A1* | 1/2020 | Takatsuka | H04L 12/28 |
| 2020/0026687 | A1* | 1/2020 | Ben Dayan | G06F 16/182 |
| 2022/0229787 | A1* | 7/2022 | Veluswamy | G06F 13/1668 |

OTHER PUBLICATIONS

NVM Express Inc., "NVM Express over Fabrics," Revision 1.1, pp. 1-83, Oct. 22, 2019.

IEEE Std 802.3ch™-2020, "IEEE Standard for Ethernet, Amendment 8: Physical Layer Specifications and Management Parameters for 2.5 GB/s, 5 GB/s, and 10 GB/s Automotive Electrical Ethernet", pp. 1-207, Jun. 4, 2020.

IEEE Std 802.3bp™-2016, "IEEE Standard for Ethernet, Amendment 4: Physical Layer Specifications and Management Parameters for 1 GB/s Operation over a Single Twisted-Pair Copper Cable", pp. 1-211, Jun. 30, 2016.

IEEE Std 802.3bw™-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.

IEEE Std 802.3cg™-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.

NVM Express Inc., "NVM Express Base Specification," Revision 1.4b, pp. 1-406, Sep. 21, 2020.

Marvell, "Marvell® NVMe-oF SSD Converter Controller", Product brief, pp. 1-2, year 2020.

Horiba Mira Ltd., "MISRA-C:2012: Technical Corrigendum 1: Technical clarification of MISRA C:2012", pp. 1-21, Jun. 2017 downloaded from https://www.misra.org.uk/LinkClick.aspx?fileticket=-BRmxs8omoM%3d&tabid=57.

BARR Group, "BARR-C:2018: Embedded C Coding Standard", pp. 1-87, year 2018 downloaded from https://barrgroup.com/sites/default/files/barr_c_coding_standard_2018.pdf.

* cited by examiner

AUTOMOTIVE NETWORK WITH CENTRALIZED STORAGE

CROSS-REFERENCE TO RELATED APPLICATIONS

This application claims the benefit of U.S. Provisional Patent Application 62/934,436, filed Nov. 12, 2019, whose disclosure is incorporated herein by reference.

FIELD OF THE DISCLOSURE

The present disclosure relates generally to automotive networks, and particularly to methods and systems for centralized data storage in automotive networks.

BACKGROUND

Modern vehicles, and in particular autonomous vehicles, generate and process extremely high volumes of data, sometimes on the order of Terabytes in the course of a day or over several days. Sources of data in an autonomous car comprise, for example, cameras and other sensors, Advanced Driver-Assistance Systems (ADAS), Telematics Control Units (TCU), Infotainment systems, as well as various Electronics Control Units (ECUs). The data produced by such sources may be transferred among different systems of the vehicle and possibly transmitted to external systems.

The description above is presented as a general overview of related art in this field and should not be construed as an admission that any of the information it contains constitutes prior art against the present patent application.

SUMMARY

An embodiment that is described herein provides an automotive data storage system disposed in a vehicle. The system includes a packet network and at least one centralized storage device. The packet network includes multiple electronic subsystems that are configured to generate data during operation of the vehicle, the electronic subsystems being deployed at different locations in the vehicle and being indirectly coupled to one another via network links and one or more network switches. The centralized storage device is installed in the vehicle and coupled to the packet network, and is configured to receive from the electronic subsystems write commands for storing the data, over the packet network, in accordance with a network storage protocol, and to store the data in the centralized storage device.

In some embodiments, at least one of the electronic subsystems includes a sensor disposed in the vehicle. In some embodiments, the electronic subsystems include at least one of an Advanced Driver-Assistance System (ADAS), a Telematics Control Unit (TCU), an Infotainment system, an Electronics Control Unit (ECU) and a central computer of the vehicle.

In some embodiments, the centralized storage device includes (i) a storage medium that supports a bus storage protocol specified for storage over a local computer bus, and (ii) a protocol converter configured to translate between commands of the bus storage protocol and commands of the network storage protocol. In an example embodiment, the storage medium and the protocol converter are fabricated in separate Integrated Circuit (IC) dies, and are packaged in a single device package. In an alternative embodiment, the storage medium and the protocol converter are fabricated in a single Integrated Circuit (IC) die.

In a disclosed embodiment, the centralized storage device is configured to receive the write commands from the electronic subsystems in accordance with a Non Volatile Memory express over Fabrics (NVMe-oF) protocol. In another embodiment, the electronic subsystems are further configured to send over the packet network, in accordance with the network storage protocol, read commands that retrieve data from the centralized storage device, and the centralized storage device is configured to provide the retrieved data to the electronic subsystems in response to the read commands. In still another embodiment, the centralized storage device includes at least two separate storage media, and is configured to store respective copies of at least some of the data in the separate storage media using a redundant storage scheme.

There is additionally provided, in accordance with an embodiment that is described herein, a method for data storage in an automotive data storage system. The method includes generating data by multiple electronic subsystems during operation of the vehicle, the electronic subsystems being deployed at different locations in the vehicle and being indirectly coupled to one another via a packet network comprising network and one or more network switches. In at least one centralized storage device installed in the vehicle and coupled to the packet network, write commands for storing the data are received from the electronic subsystems, over the packet network, in accordance with a network storage protocol. The data is stored in the centralized storage device.

The present disclosure will be more fully understood from the following detailed description of the embodiments thereof, taken together with the drawings in which:

DETAILED DESCRIPTION OF EMBODIMENTS

Figure 1:
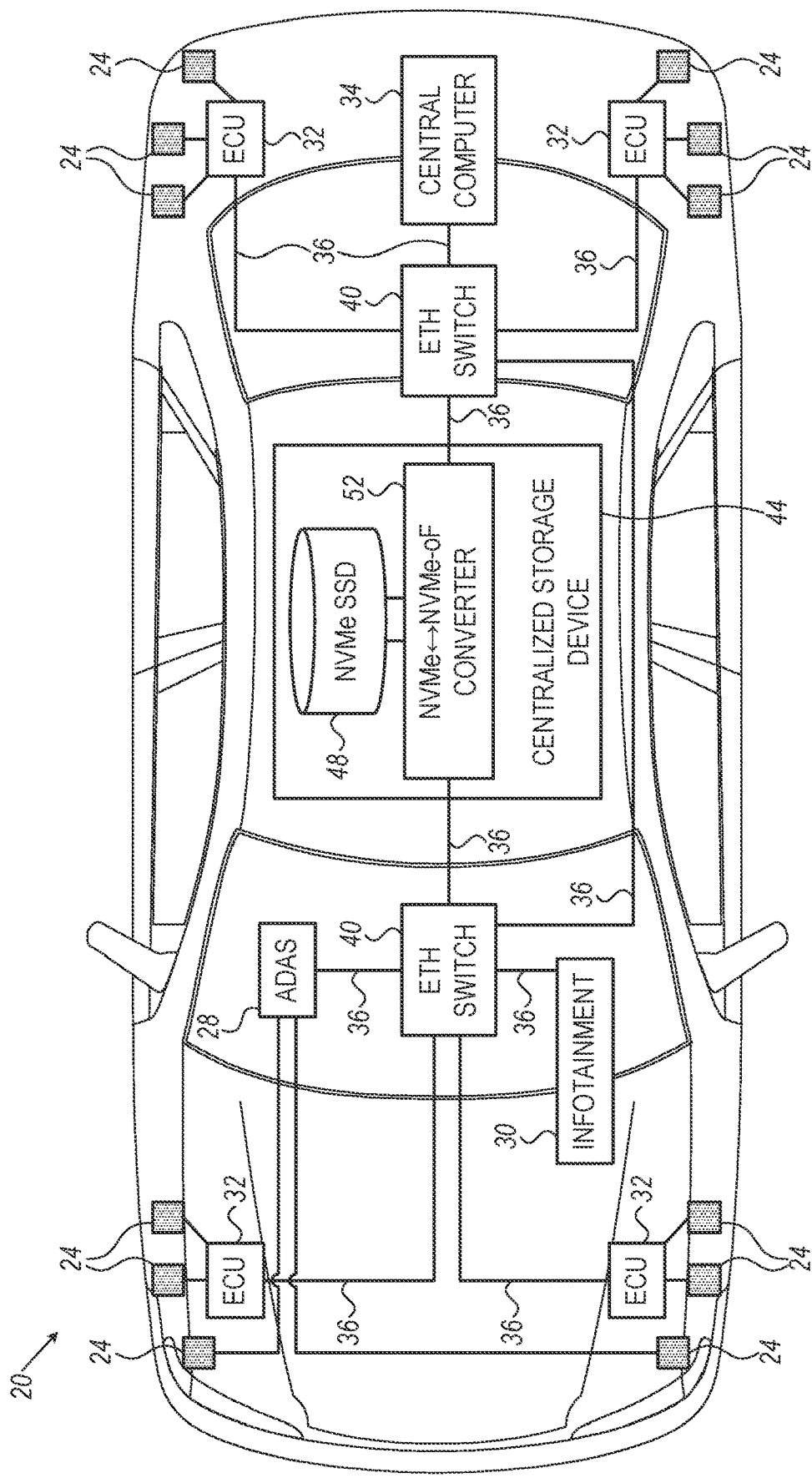
FIG. 1 is a block diagram that schematically illustrates an automotive data processing system employing centralized data storage, in accordance with an embodiment that is described herein.

Embodiments that are described herein provide improved methods and apparatus for data storage in automotive data processing systems. In disclosed embodiments, an automotive data processing system comprises various devices that are disposed in a vehicle and produce data. The data may generally relate to the environment and surroundings of the vehicle, to driver behavior, to the operation of various vehicle components or system, and the like. The devices may comprise, for example, various sensors such as video cameras, velocity sensors, accelerometers, audio sensors, infra-red sensors, radar sensors, lidar sensors, ultrasonic sensors and/or rangefinders or other proximity sensors. Another type of device that produces data comprises a wireless receiver, which receives data from outside the vehicle, e.g., from a cloud application.

The automotive data processing system further comprises multiple electronic subsystems, such as an Advanced Driver-Assistance System (ADAS), a Telematics Control Unit (TCU) and an Infotainment system. Other electronics subsystems comprise Electronics Control Units (ECUs) that control sensors and other devices and receive data from controlled devices. In many cases the electronic subsystems themselves produce data, and/or process data that they receive from devices or from other electronic subsystems. Therefore, in the present context the electronic subsystems are also considered to be devices that produce data.

The various electronic subsystems communicate over a packet network installed in the vehicle. The network may comprise, for example, an Ethernet network that comprises one or more Ethernet packet switches, multiple Ethernet links and a gateway, such as a secure gateway. A central computer of the vehicle is typically also connected to the network, and is also considered one of the electronic subsystems.

In the disclosed embodiments, the automotive data processing system further comprises at least one centralized storage device installed in the vehicle. The centralized storage device, e.g., a Solid State Drive (SSD), is configured to store data that is provided by and/or used by the various electronic subsystems of the vehicle. In some embodiments, two or more centralized storage devices may be used, e.g., for redundancy.

In some embodiments, the centralized storage device is configured as a network element and is connected directly to the network, e.g., to one or more ports of one or more of the network switches and a secure gateway that provides a security functionality for all or part of the network. For example, the centralized storage device may be configured to receive storage commands (e.g., write and read commands) in accordance with a network storage protocol such as Non-Volatile Memory express over Fabrics (NVMe-oF). NVMe-oF is specified, for example, in "NVM Express™ over Fabrics," Revision 1.1, Oct. 22, 2019.

In these embodiments, the electronic subsystems are configured to store data in the centralized storage device, by sending suitable NVMe-oF write commands to the centralized storage device over the network. Similarly, the electronic subsystems may be configured to retrieve data from the centralized storage device, by sending suitable NVMe-oF read commands over the network.

The network-attached centralized storage architecture described herein provides important benefits to automotive data processing systems. For example, the disclosed solution is highly scalable and flexible—Capacity can be scaled transparently by adding centralized storage devices anywhere in the network. The capacity and location of storage resources can be completely virtualized. The disclosed architecture also integrates well with zonal architectures used in modern automotive data processing systems.

The disclosed solution also enables efficient data sharing between subsystems, such as the vehicle TCU, ADAS, infotainment and central computer. In an example use-case, the central computer is to process data sent from multiple ECUs. Storing the data centrally is much more efficient for the central computer. When storing the data centrally, there is no need for direct communication between the central computer and the ECUs, and the central computer can read any needed data from storage at any time. In other words, performance is enhanced by decoupling the storage process from the retrieval process: the ECUs can write the data whenever available, the central computer can read and process the data whenever needed.

Another example use-case is background downloading of three-dimensional maps to an autonomous car while in motion. When using the disclosed solution, the maps can be downloaded from the cloud into the centralized storage device. Then, any ECU that requires the use of a map is able to read the data at its own time without interrupting the central computer.

Moreover, the network storage protocols used in the disclosed architecture, such as NVMe-oF, are characterized by very small latency, a property that is important in vehicular data processing applications. The network storage protocols may be deployed over transport protocols such as RDMA or TCP, which are both reliable protocols.

Furthermore, since the disclosed storage devices are attached directly to the network (rather than being accessed via a specific host), the system has no single point of failure. Redundancy can also be added, e.g., by using multiple centralized storage devices and/or by connecting a centralized storage device to the network via multiple switch ports or even via different switches.

FIG. 1 is a block diagram that schematically illustrates an automotive data processing system 20, in accordance with an embodiment that is described herein. System 20 is installed in a vehicle, and comprises various sensors 24, multiple Electronics Control Units (ECUs) 32, an Advanced Driver-Assistance System (ADAS) 28, an infotainment system 30 and a central computer 34.

As noted above, sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors. In an embodiment, one or more of sensors 24, e.g., image sensors, are connected directly to ADAS 28, not via ECUs 32.

In the present context, any element in system 20 that produces data (including, for example, sensors 24, ECUs 32, ADAS 28, infotainment system 30 and central computer 34) is considered a "device." Any element in system 20 that sends data for centralized storage (including, for example, ECUs 32, ADAS 28, infotainment system 30 and central computer 34) is considered an "electronic subsystem." As seen, a certain system component may serve both as a device and as an electronic subsystem.

In some embodiments, the various electronic subsystems of system 20 are deployed at various different locations in the vehicle, and communicate over a packet network installed in the vehicle. In the present example an Ethernet network, but other suitable protocols can also be used. The network comprises multiple Ethernet links 36, and one or more Ethernet switches 40. In various embodiments, the bit rate used in the network may be 10 G bits per second (10 Gbps) in accordance with IEEE 802.3ch, 1000 Mbps in accordance with IEEE 802.3bp, 100 Mbps in accordance with IEEE 802.3bw, 10 Mbps in accordance with IEEE 802.3cg (10Base-T1s), or any other suitable bit rate. Links 36 may comprise, for example, twisted-pair copper links or any other type of link suitable for Ethernet communication.

In the example of FIG. 1, system 20 further comprises a centralized storage device 44. Centralized storage device 44 is connected directly to the packet network installed in the vehicle. As seen in the figure, in the present example centralized storage device 44 comprises two interfaces that are connected via respective links 36 to two different ports of two different switches 40. This scheme provides a degree of redundancy, since failure of a single interface (or of the corresponding link) will not disconnect centralized storage device 44 from the network.

Typically, centralized storage device 44 and the electronic subsystems of system 20 communicate using a network storage protocol such as NVMe-oF. The description below refers to NVMe-oF by way of example. In alternative embodiments, any other suitable storage protocol can be used. One example of an alternative storage protocol is NVMe over TCP. Further alternatively, centralized storage device 44 and the electronic subsystems of system 20 may exchange storage commands using any suitable network protocol, with centralized storage device as the address (MAC address, IP address or other). Centralized storage device 44 can then de-capsulate and analyze the command. In other words, the storage commands may have any suitable format, not necessarily compliant with any standard.

In some embodiments, centralized storage device 44 comprises an NVMe-oF compliant Solid State Drive (SSD). In other embodiments, as in the example of FIG. 1, centralized storage device 44 comprises an NVMe compliant SSD 48 and an NVMe↔NVMe-oF converter 52.

Being NVMe compliant, SSD 48 runs an NVMe protocol stack and is configured to communicate via a Peripheral Component Interconnect express (PCIe) computer bus. NVMe is specified, for example, in "NVM Express™ Base Specification," Revision 1.4b, Sep. 21, 2020.

In the present context, PCIe is regarded as an example of a local computer bus; NVMe is regarded as an example of a bus storage protocol specified for storage over a local computer bus; and NVMe SSD 48 is regarded as an example of a storage medium that supports a bus storage protocol. In alternative embodiments, other suitable types of buses, storage protocols and storage media can be used.

In an embodiment, NVMe↔NVMe-oF converter 52 is a protocol converter that runs an NVMe-oF protocol stack and is configured to translate between NVMe commands and NVMe-oF commands. The interface between NVMe SSD 48 and NVMe↔NVMe-oF converter 52 thus comprises a PCIe bus. Together, NVMe SSD 48 and NVMe↔NVMe-oF converter 52 form an NVMe-oF network-attached SSD. In an example embodiment, NVMe↔NVMe-oF converter 52 comprises a Marvell product named 88SN2400, which is described, for example, in a product sheet entitled "Marvell® NVMe-oF SSD Converter Controller," April, 2020, whose disclosure is incorporated herein by reference.

The external physical interfaces of NVMe↔NVMe-oF converter 52 (and thus of centralized storage device 44) are Ethernet interfaces. The physical layer on the external interfaces of NVMe↔NVMe-oF converter 52 (and thus of centralized storage device 44) may comprise RoCEv2 (in which case the transport layer typically comprises UDP) or NVMe/TCP or iWARP (in which case the transport layer typically comprises TCP).

In one embodiment, NVMe↔NVMe-oF converter 52 is implemented in an Integrated Circuit (IC), NVMe SSD 48 is implemented in one or more other ICs, and NVMe↔NVMe-oF converter 52 is connected via an interposer on top of NVMe SSD 48. In this embodiment, NVMe SSD 48 (or other suitable storage medium) and NVMe↔NVMe-oF converter 52 (or other suitable protocol converter) are typically packaged in a single device package. In another embodiment, the functionality of NVMe↔NVMe-oF converter 52 is implemented in an SSD controller of NVMe SSD 48. In this embodiment, it is possible for centralized storage device 44 to expose both NVMe and NVMe-oF external interfaces. Further alternatively, NVMe SSD 48 and NVMe↔NVMe-oF converter 52 may be integrated or connected in any other suitable way.

In an embodiment, the electronic subsystems of system 20 (e.g., ECUs 32, ADAS 28, infotainment system 30 and central computer 34) store data in centralized storage device 44 by sending NVMe-oF write commands to centralized storage device 44 over the network. In an embodiment, the electronic subsystems retrieve data from centralized storage device 44 by sending suitable NVMe-oF read commands to centralized storage device 44 over the network. The NVMe-oF write and read commands traverse links 36 and switches 40 as appropriate, en route to centralized storage device 44. In device 44, converter 52 translates the NVMe-oF commands into NVMe commands that are executed by SSD 48. SSD 48 typically comprises multiple Flash memory devices that store the data.

The configuration of communication system 20 and its components, such as of the various devices and electronic subsystems and/or of centralized storage device 44, as shown in FIG. 1, are example configurations that are depicted solely for the sake of clarity. In alternative embodiments, any other suitable configurations can be used. For example, system 20 may comprise other suitable types of electronic subsystems and/or devices, laid out and connected in any other suitable scheme. As another example, the packet network (including links 36 and switches 40) may have any other suitable topology.

As yet another example, in some embodiments centralized storage device 44 stores at least part of the data using a redundant storage scheme such as Redundant Array of Independent Disks (RAID). Redundant storage may be applied, for example, to forensic data or to any other suitable type of data. An example RAID scheme is RAID-1 (also referred to as "mirroring") in which two copies of the data are stored in two separate storage media (e.g., two separate SSDs). In alternative embodiments, any other suitable RAID scheme, or other suitable redundant storage scheme, can be used. In an example embodiment, centralized storage device 44 comprises two SSDs 48, and a RAID controller is connected between SSDs 48 and NVMe↔NVMe-oF converter 52. In this embodiment, NVMe↔NVMe-oF converter 52 operates as described above, and the redundant storage scheme (e.g., RAID-1) is handled by the RAID controller. In an alternative embodiment, centralized storage device 44 comprises two SSDs 48 that are connected to NVMe↔NVMe-oF converter 52, e.g., via a switch. In this embodiment the redundant storage scheme (e.g., RAID-1) is handled by NVMe↔NVMe-oF converter 52, e.g., in software.

The different elements of system 20 and its components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of the components of system 20, e.g., of ECUs 32 and/or storage device 44, may be implemented in software and/or using a combination of hardware and software elements. Elements that are not mandatory for understanding of the disclosed techniques have been omitted from the figure for the sake of clarity.

In some embodiments, some functions of ECUs 32 and/or storage device 44 may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
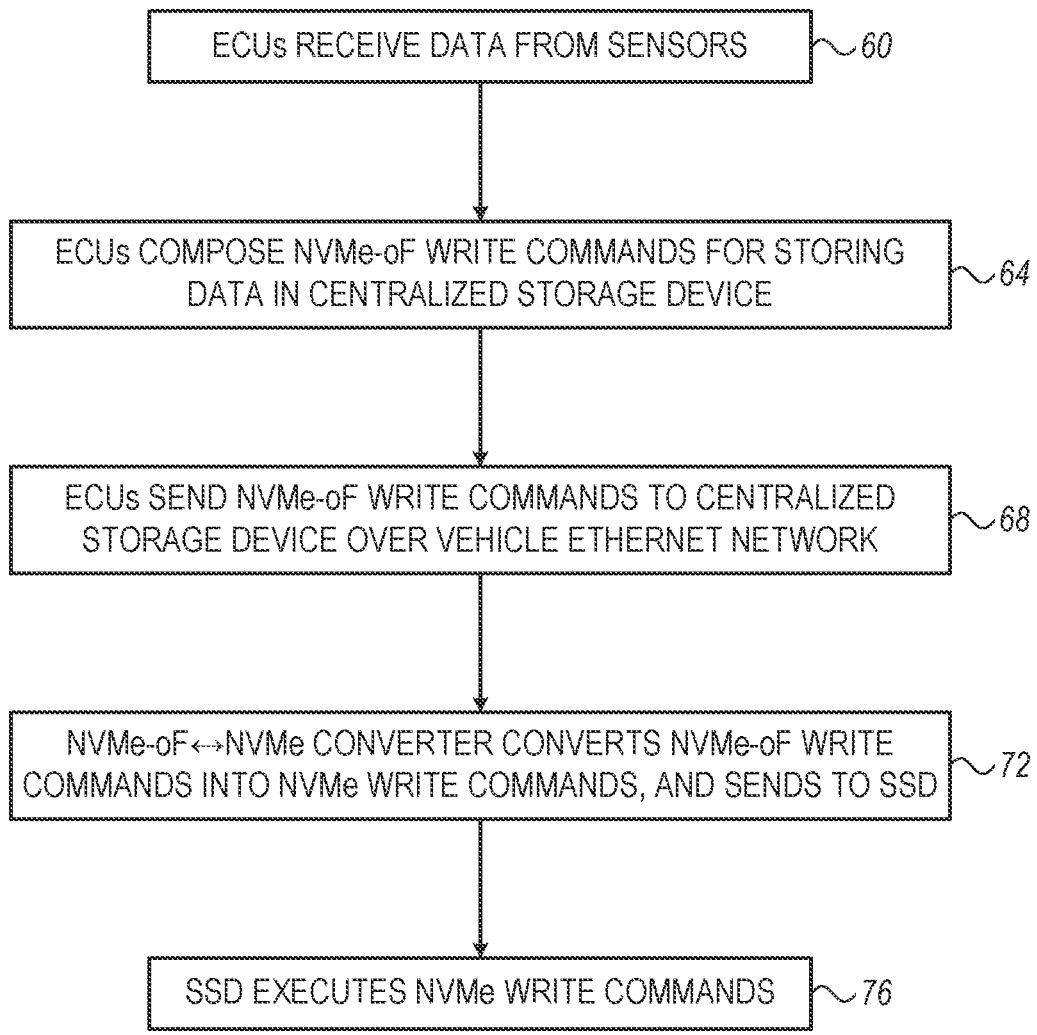
FIG. 2 is a flow chart that schematically illustrates a method for data storage in the automotive data processing system of FIG. 1, in accordance with an embodiment that is described herein.

FIG. 2 is a flow chart that schematically illustrates a method for data storage in automotive data processing system 20 of FIG. 1, in accordance with an embodiment that is described herein. The example of FIG. 2 demonstrates a process in which ECUs 32 store data received from sensors 24, by way of example. A similar process can be used by any other suitable electronic subsystem for storing data in centralized storage device 44.

The method begins with ECUs 32 receiving data from sensors 24, at a data reception operation 60. At a write generation operation 64, ECUs 32 compose NVMe-oF write commands that carry the data and are addressed to centralized storage device 44. At a write sending operation 68, ECUs 32 send the NVMe-oF write commands to centralized storage device 44 over the network. At a translation operation 72, NVMe⇔NVMe-oF converter 52 translates the NVMe-oF write commands into NVMe write commands, and sends the NVMe write commands to NVMe SSD 48. At a write execution operation 76, NVMe SSD 48 stores the data by executing the NVMe write commands.

The method of FIG. 2 is an example method that is depicted solely for the sake of clarity. In alternative embodiments, any other suitable method can be used. For example, a similar method can be used by electronic subsystems for reading data from SSD 48 of centralized storage device 44.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive data storage system disposed in a vehicle, the system coupled to a packet network having multiple electronic subsystems that are configured to generate data during operation of the vehicle, the electronic subsystems being deployed at different locations in the vehicle and being indirectly coupled to one another via network links and one or more network switches, the system comprising at least one centralized storage device that is installed in the vehicle and is coupled to the packet network, the centralized storage device comprising:
   a storage medium configured to receive data for storage, the data being provided to the storage medium in commands of a bus storage protocol specified for storage over a local computer bus; and
   a protocol converter, which is fabricated with the storage medium in a single Integrated Circuit (IC) die, or in separate IC dies packaged in a single device package, the protocol converter configured to receive from the electronic subsystems, over the packet network, write commands for storing the data, to translate the write commands, within the single IC or IC dies in which the storage medium is fabricated, into commands of the bus storage protocol, and to store the data in the storage medium in accordance with the bus storage protocol.

2. The automotive data storage system according to claim 1, wherein at least one of the electronic subsystems comprises a sensor disposed in the vehicle.

3. The automotive data storage system according to claim 1, wherein the electronic subsystems comprise at least one of an Advanced Driver-Assistance System (ADAS), a Telematics Control Unit (TCU), an Infotainment system, an Electronics Control Unit (ECU) and a central computer of the vehicle.

4. The automotive data storage system according to claim 1, wherein the centralized storage device is configured to receive the write commands from the electronic subsystems in accordance with a Non Volatile Memory express over Fabrics (NVMe-oF) protocol.

5. The automotive data storage system according to claim 1, wherein the electronic subsystems are further configured to send over the packet network, in accordance with the network storage protocol, read commands that retrieve data from the centralized storage device, and wherein the centralized storage device is configured to provide the retrieved data to the electronic subsystems in response to the read commands.

6. The automotive data storage system according to claim 1, wherein the centralized storage device comprises at least two separate storage media, and is configured to store respective copies of at least some of the data in the separate storage media using a redundant storage scheme.

7. The automotive data storage system according to claim 1, wherein the protocol converter is fabricated in the separate IC dies, and wherein the separate IC dies are connected by an interposer.

8. A method for data storage in an automotive data storage system, the method comprising:
   receiving write commands from multiple electronic subsystems during operation of the vehicle, the electronic subsystems being deployed at different locations in the vehicle and being indirectly coupled to one another via a packet network comprising network and one or more network switches, the write commands received over the packet network for storing the data in at least one centralized storage device that is installed in the vehicle and is coupled to the packet network;
   using a protocol converter in the centralized storage device, translating the write commands into commands of a bus storage protocol specified for storage over a local computer bus; and
   storing the data in a storage medium in the centralized storage device, by providing the storage commands of the bus storage protocol to the storage medium, the storage medium being fabricated with the protocol converter in a single Integrated Circuit (IC) die, or in separate IC dies packaged in a single device package, so that translation of the write commands into the commands of a bus storage protocol, and storage of the data in the storage medium, are performed within the single IC or IC dies in which the storage medium is fabricated.

9. The method according to claim 8, wherein generating the data comprises generating the data by a sensor disposed in the vehicle.

10. The method according to claim 8, wherein receiving the write commands comprises receiving the write commands from at least one of an Advanced Driver-Assistance System (ADAS), a Telematics Control Unit (TCU), an Infotainment system, an Electronics Control Unit (ECU) and a central computer of the vehicle.

11. The method according to claim 8, wherein receiving the write commands comprises receiving the write commands from the electronic subsystems in accordance with a Non Volatile Memory express over Fabrics (NVMe-oF) protocol.

12. The method according to claim 8, further comprising sending from the electronic subsystems, over the packet network, in accordance with the network storage protocol, read commands that retrieve data from the centralized storage device, and providing the retrieved data from the centralized storage device to the electronic subsystems in response to the read commands.

13. The method according to claim 8, wherein storing the data in the centralized storage device comprises storing respective copies of at least some of the data in two or more separate storage media using a redundant storage scheme.

14. The method according to claim 8, wherein the protocol converter is fabricated in the separate IC dies, and wherein the separate IC dies are connected by an interposer.

* * * * *